United States Patent
Balasubramanian et al.

(10) Patent No.: US 10,839,128 B2
(45) Date of Patent: Nov. 17, 2020

(54) ERROR DETECTION TECHNIQUE BASED ON IDENTIFYING DATA TREND ISSUES

(71) Applicant: Arm Limited, Cambridge (GB)

(72) Inventors: Satheesh Balasubramanian, Bangalore (IN); Manigandeshwaran Mallikeswaran, Bangalore (IN)

(73) Assignee: Arm Limited, Cambridge (GB)

( * ) Notice: Subject to any disclaimer, the term of this patent is extended or adjusted under 35 U.S.C. 154(b) by 187 days.

(21) Appl. No.: 16/013,937

(22) Filed: Jun. 21, 2018

(65) Prior Publication Data

US 2019/0392103 A1 Dec. 26, 2019

(51) Int. Cl.
*G06F 30/00* (2020.01)
*G06F 30/367* (2020.01)
*G06F 111/10* (2020.01)

(52) U.S. Cl.
CPC ........ *G06F 30/367* (2020.01); *G06F 2111/10* (2020.01)

(58) Field of Classification Search
CPC ............................ G06F 30/367; G06F 2111/10
USPC ......................................................... 716/100
See application file for complete search history.

(56) References Cited

U.S. PATENT DOCUMENTS

| | | | |
|---|---|---|---|
| 9,348,957 B1 * | 5/2016 | Liu ..................... | G06F 30/367 |
| 9,823,298 B2 | 11/2017 | Balasubramanian et al. | |
| 2011/0000829 A1 * | 1/2011 | Linde ............... | G01R 31/31718 209/571 |
| 2016/0364517 A1 | 12/2016 | Pelloie et al. | |

* cited by examiner

*Primary Examiner* — Suchin Parihar
(74) *Attorney, Agent, or Firm* — Pramudji Law Group PLLC; Ari Pramudji (57) ABSTRACT

Various implementations described herein are directed to a system and methods for validating data points associated with an integrated circuit. In one implementation, the method may include retrieving data table associated with an integrated circuit, wherein the data table includes characterized electrical data associated with one or more cells of the integrated circuit. Further, the method may include converting the data table to one or more relative matrices. The one or more relative matrices are analyzed to determine a trend formed by entries of the one or more relative matrices. Further, the method may include determining whether one or more entries of the one or more relative matrices deviate from the trend. In response to the determination, the data table is flagged.

20 Claims, 9 Drawing Sheets

Electrical Data Table 501

```
{
fall_transition (delay_template) {
   index_1 ("7.14657, 37.8095, 99.1352, 217.954, 459.423, 942.363, 1908.24, 3840");
   index_2 ("0.111546, 0.422971, 1.04562, 2.25259, 4.76506, 9.61, 19.4199, 39.0396");
   values ( \
      "236.463, 246.333, 65.6439, 101.104, 173.411, 318.832, 609.74, 1191.99", \
      "37.3464, 47.0838, 65.6893, 101.109, 173.365, 318.81, 609.782, 1191.93", \
      "37.4822, 47.2102, 65.7438, 101.183, 173.295, 318.823, 609.76, 1191.85", \
      "37.7689, 47.4742, 65.9289, 101.235, 173.228, 318.617, 609.81, 1192.08", \
      "39.1407, 48.7036, 67.047, 102.102, 173.949, 318.936, 609.891, 1192.56", \
      "42.7476, 52.2393, 70.266, 104.766, 175.797, 320.437, 610.751, 1192.16", \
      "51.7873, 61.0262, 78.3077, 111.283, 180.626, 323.723, 613.081, 1193.92", \
      "71.5437, 83.0197, 97.3835, 127.826, 192.274, 331.169, 618.36, 1198.08" \
   );
}
}
```

Formula 505

$$\frac{\text{T-Entry (Row X, Entry Y)}}{\text{T-Entry (Row X, Entry Y+1)}} = \text{M-Entry (Row X, Entry Y)}$$

Relative Matrix 510

```
27
28 ratio_index1rev: Max,     Min,        Average
29 3.75256497557  0.511413262226  0.727898317191
30 [ [0.960  3.753  0.649  0.583  0.544  0.523  0.512
31   [0.794  0.716  0.650  0.583  0.544  0.522  0.512
32   [0.794  0.718  0.650  0.584  0.544  0.523  0.512
33   [0.796  0.720  0.651  0.584  0.544  0.522  0.512
34   [0.803  0.727  0.657  0.587  0.545  0.523  0.511
35   [0.818  0.743  0.671  0.596  0.549  0.525  0.512
36   [0.849  0.779  0.704  0.616  0.558  0.528  0.514
37   [0.883  0.832  0.762  0.665  0.581  0.536  0.516
38
39
```

Relative Matrix 810

```
27
28 ratio_index1rev: Max, Min, Average
29 3.75256497557 0.511413262226 0.727898317191
30 |0.960 3.753 0.649 0.583 0.544 0.523 0.512
31 |0.794 0.716 0.650 0.583 0.544 0.522 0.512
32 |0.794 0.718 0.650 0.584 0.544 0.523 0.512
33 |0.796 0.720 0.651 0.584 0.544 0.522 0.512
34 |0.803 0.727 0.657 0.587 0.545 0.523 0.511
35 |0.818 0.743 0.671 0.596 0.549 0.525 0.512
36 |0.849 0.779 0.704 0.616 0.558 0.528 0.514
37 |0.883 0.832 0.762 0.665 0.581 0.536 0.516
38
39
```

Reverence value

Calculation Box 812

Max Value = 3.7525
Min Value = 0.5114
Average Value = 0.7278
|Average − Min| = 0.2164
|Average − Max| = 3.0247

$Entry_N Row_N - Entry_{N+1} Row_N \gg$ Reference Value?

Result Table 820

| FAIL | PASS | PASS | PASS | PASS | PASS |
|------|------|------|------|------|------|
| PASS | PASS | PASS | PASS | PASS | PASS |
| PASS | PASS | PASS | PASS | PASS | PASS |
| PASS | PASS | PASS | PASS | PASS | PASS |
| PASS | PASS | PASS | PASS | PASS | PASS |
| PASS | PASS | PASS | PASS | PASS | PASS |
| PASS | PASS | PASS | PASS | PASS | PASS |
| PASS | PASS | PASS | PASS | PASS | PASS |

ERROR DETECTION TECHNIQUE BASED ON IDENTIFYING DATA TREND ISSUES

TECHNICAL FIELD

The present disclosure relates to data error detection techniques, and more particularly, it relates to a method, system, and computer program product for determining the accuracy of characterized electrical data associated with simulations of integrated circuits.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

The semiconductor fabrication of an integrated circuit may involve formation of a number of interconnected electronic components on a semiconductor substrate. These electronic components include resistors, transistors, capacitors, inductors, and etc. The fabrication process of the electronic components are fairly expensive and encompass several manufacturing steps such as deposition, etching, diffusion, and implantation. A typical standard cell based integrated circuit may require several repetition of these semiconductor steps to achieve the intended design. Therefore, before starting the manufacturing operation of an integrated circuit, an exhaustive list of tests are performed to ensure the accuracy of cell designs. More often, the cell designs are tested by simulation software under varying conditions that resemble operational situations. The result of these simulations are used to perform different analysis before granting the necessary approval to start the fabrication of the chips. As such, it is important for the simulation results to be presented accurately and free of structural and substantive errors.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described.

DETAILED DESCRIPTION

The present disclosure relates to data error detection techniques, and more specifically, it relates to a method, system, and computer program product for determining the accuracy of characterized electrical data associated with simulations of an integrated circuits. For instance, techniques disclosed are directed at dynamically identifying one or more data trends within electrical data tables. The electrical data tables include entries representing characterized electrical data associated with a cell of an integrated circuit. The electrical data tables with one or more entries deviating from the identified data trends are flagged as bad data.

The one or more data trends corresponding to an electrical data table may be identified by machine learning techniques. In such a method, different categories of data trends are defined and the system is trained on each category by analyzing numerous samples of validated data. Then, a data set under analysis is categorized in one of the defined categories and one or more entries violating the trend category are identified. In other embodiments, mathematical algorithms are used to determine the distribution of the entries within data sets. One or more entries that do not match the determined distribution are identified as bad data.

The data validation techniques disclosed herein provide an accurate and efficient way of identifying errors within characterized electrical data corresponding to an integrated circuit. Such measures reduce the risk of defects in a semiconductor fabrication operation. The self-tuning feature of the disclosed technique decreases the risk of machine error and eliminates the need for human intervention. The techniques disclosed improve the accuracy of locating errors without the need for additional debugging steps.

Various implementations of a system and methods for smart error detection will now be described in more detail with reference to FIGS. 1 through 9.

Figure 1:
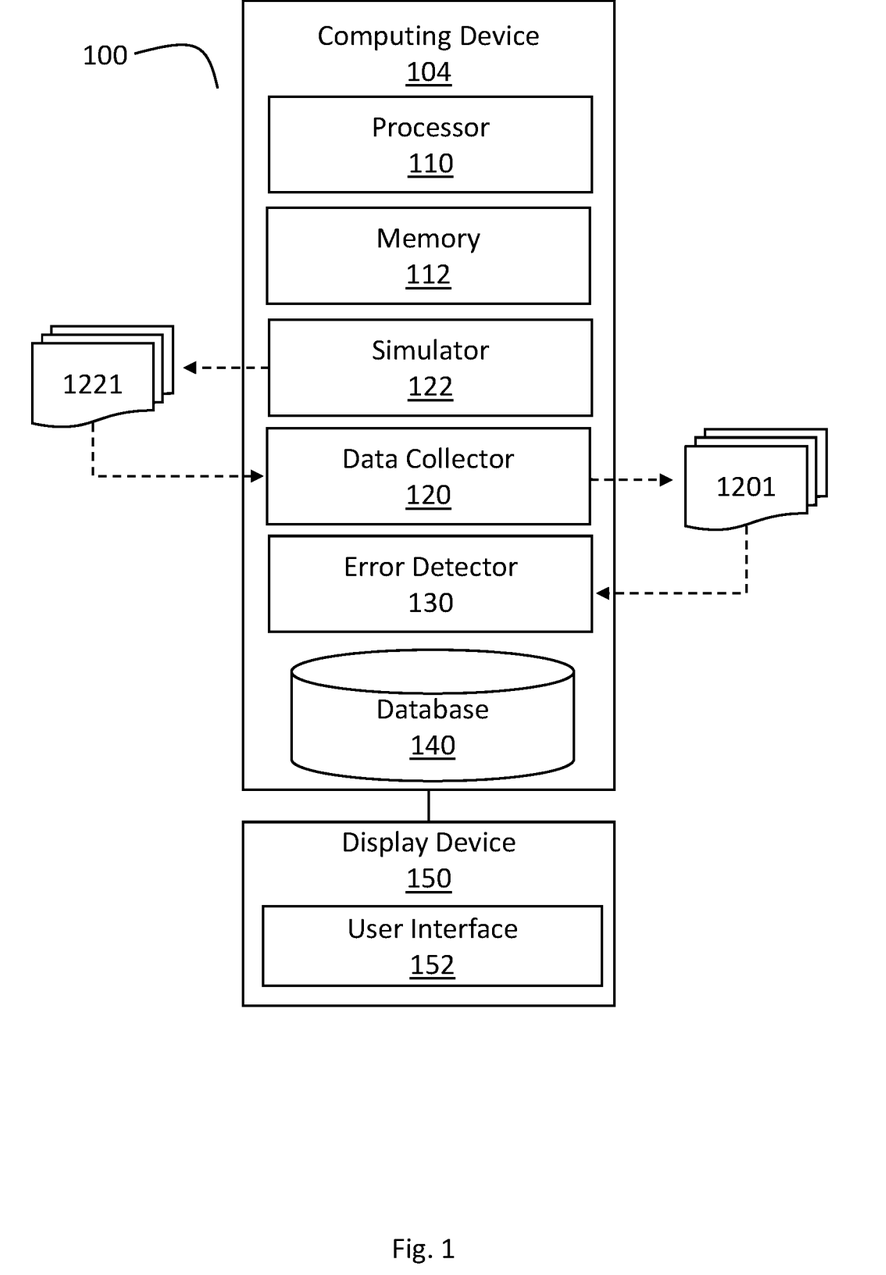
FIG. 1 illustrates a block diagram of a system configured to perform data validation techniques in accordance with various implementations described herein.

FIG. 1 illustrates a block diagram of a system 100 configured to perform data validation techniques in accordance with various implementations described herein. The system 100 may be associated with a computing device 104 implemented as a special purpose machine configured to generate characterized electrical data and to perform error check, as described herein. While a single computing device is depicted in FIG. 1, one skilled in the art would recognize the operations described herein could be performed by several computing devices (e.g., cloud computing). For example, simulation operations could be performed in a first group of computing devices while error detection operation may be performed in a second group of computing devices.

The computing device 104 may include any standard element(s) and/or component(s), including at least one processor(s) 110, memory 112 (e.g., non-transitory computer-readable storage medium), one or more database(s) 140, power, peripherals, and various other computing elements and/or components that may not be specifically shown in FIG. 1. The computing device 104 may include instructions stored on the non-transitory computer-readable medium 112 that are executable by the at least one processor 110. The computing device 104 may be associated with a display device 150 (e.g., a monitor or other display) that may be used to provide a user interface (UI) 152, such as, e.g., a graphical user interface (GUI). In some instances, the UI 152 may be used to receive various parameters and/or preferences from a user for managing, operating, and/or utilizing the computing device 104. As such, the computing device 104 may include the display device 150 for providing output to users, and the display device 150 may include the UI 152 for receiving input from the users.

The computing device 104 may include a simulator 122 configured to cause the at least one processor 110 to generate one or more simulations of the integrated circuit. In some instances, the simulator 122 may include a SPICE simulator configured to generate SPICE simulations of the integrated circuit. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Other simulation software, for example, Cadence Spectre and Synopsys HSPICE, may also be used for the same purpose.

The simulator 122 interfaces with a data collector 120. The data collector 120 receives characterized electrical data 1221 based on one or more simulations of the integrated circuit for a varying range of operating conditions including a range of voltage variations and temperature variations. The data collector 120 retrieves the electrical data and converts them to an appropriate format for further analysis. For example, the data collector 120 may generate liberty files 1201 that may be used by electronic design automation (EDA) tools to perform static timing analysis (STA) and power analysis of the integrated circuits and circuit blocks.

In some instances, the liberty files 1201 may be used to provide timing and power parameters associated with one or more cells of an integrated circuit. The timing and power parameters may be generated from simulating cells of the integrated circuit under various operating conditions, and the data associated therewith may be represented in a liberty file format. The liberty files 1201 may include timing models and related data to calculate various timing characteristics and/or parameters associated with the integrated circuit, such as, input/output (I/O) delay paths, timing check values, interconnect delays, and etc.

The computing device 104 may further include an error detector 130. The error detector 130 receives the liberty files 1201 and perform a validation check on them. The validation check includes verifying the data is presented in a proper format. For example, the error detector 130 ensure the liberty files 1201 are compatible with EDA tools. Furthermore, the error detector 130 validates the liberty files 1201 for data error (i.e., to ensure each of the data entries representing an accurate value). The operation of the error detector 130 in coordination with the simulator 122 and data collector 130 is explained in detail with reference to the flowchart of FIG. 2 below.

In some implementation, the computing device 104 may include one or more databases 140 configured to store and/or record various information related to characterized electrical data. For instance, the database(s) 140 may be configured to store information related to the integrated circuit and one or more of various timing data, liberty files, and equation related data (e.g., the fitting mathematical equation and data related thereto). Further, the database(s) 140 may be configured to store information related to the integrated circuit in reference to simulation data (including, e.g., SPICE simulation data). Finally, the database(s) 140 may be configured to store data required for training the error detector 130 through machine learning techniques. The training data includes large volume of validated data to be analyzed for identifying data trend categories.

Figure 2:
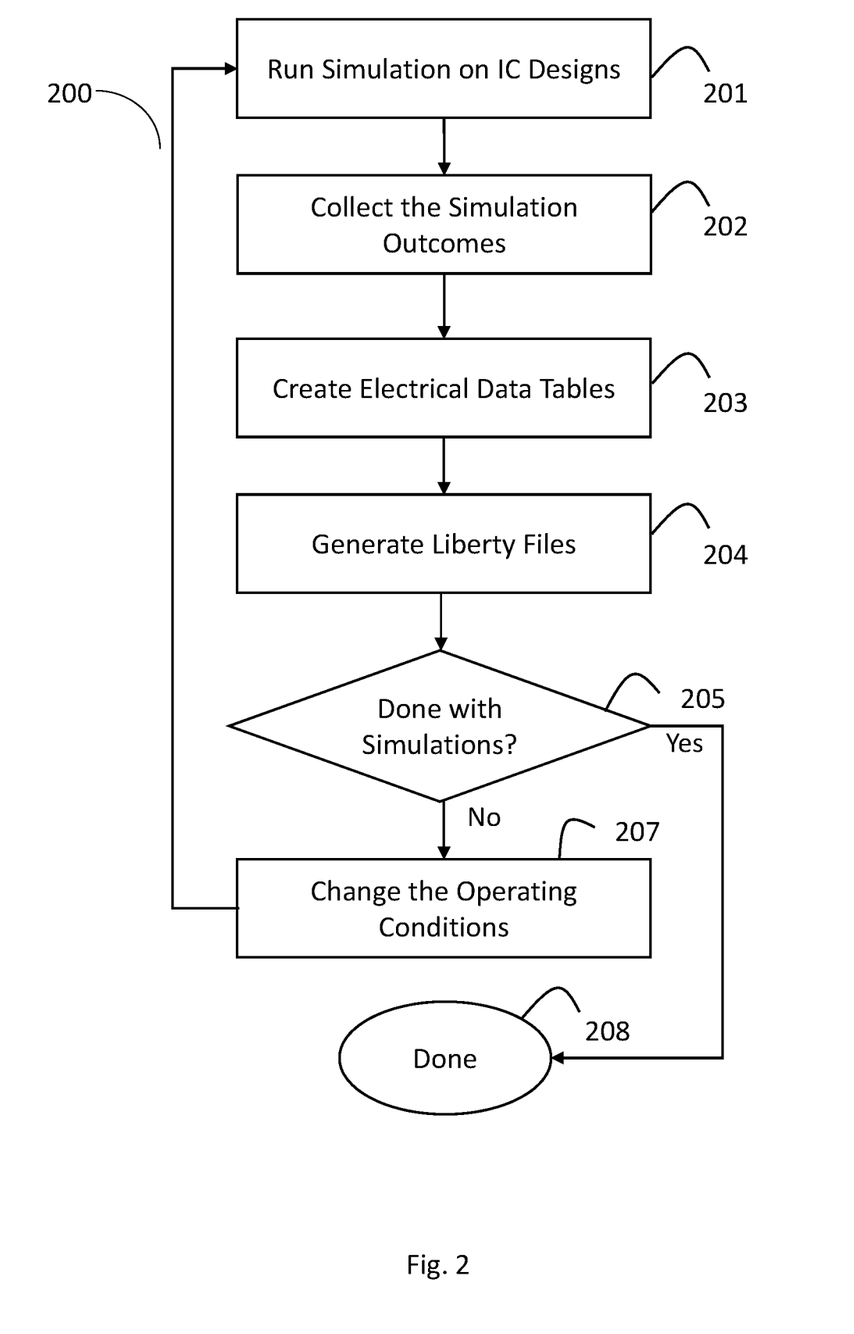
FIG. 2 shows, in flowchart form, an operation to collect characterized electrical data for validation according to an embodiment of the disclosure.
Figure 3:
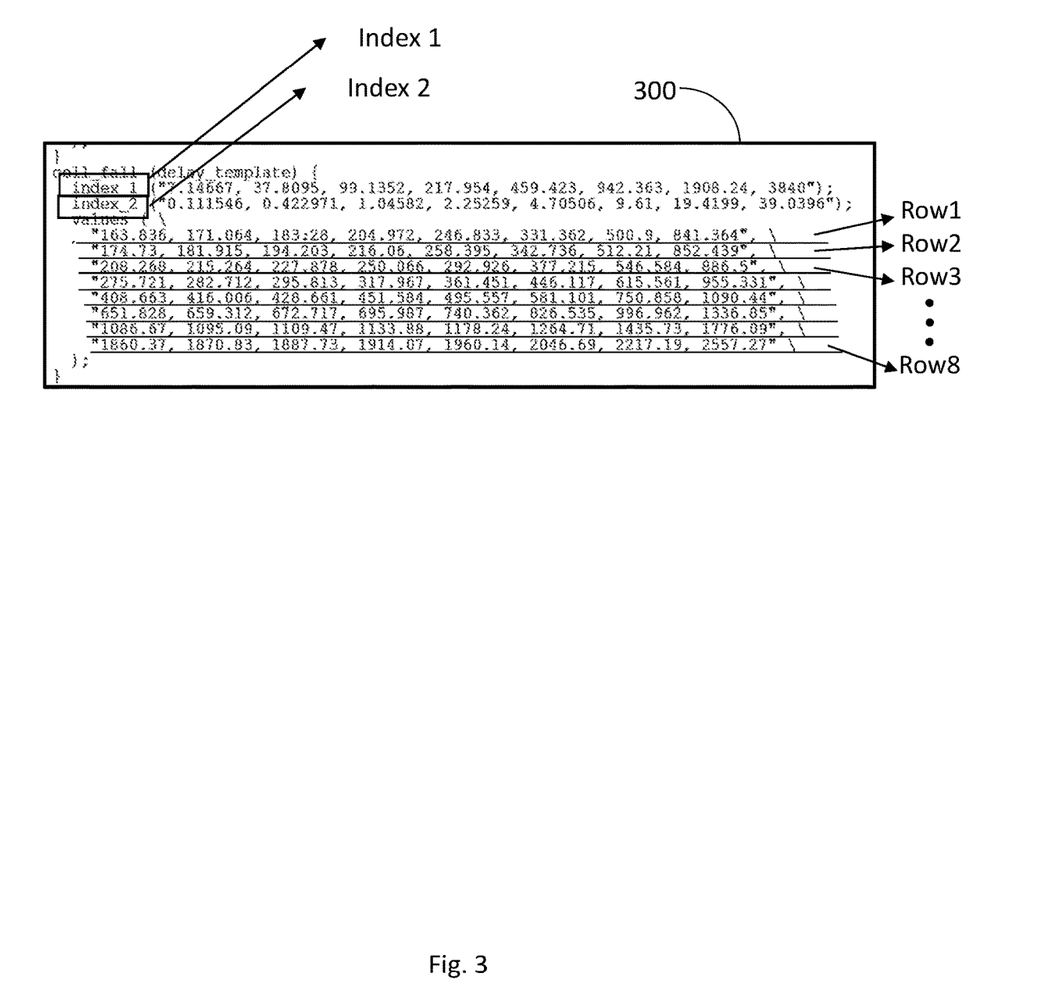
FIG. 3 illustrate an example of an electrical data table in accordance with an embodiment of the disclosure.

FIG. 2 shows, in flowchart form, an operation 200 to collect characterized electrical data for validation according to an embodiment of the disclosure. The validation operation may be performed on data collected based on the operation 200 or other methods of collecting characterized electrical data.

It should be understood that even though method 200 may indicate a particular order of operation execution, in some cases, various portions of the operations may be executed in a different order, and on different systems. In some other cases, additional operations and/or steps may be added to and/or omitted from method 200. Method 200 may be implemented in hardware and/or software. If implemented in hardware, method 200 may be implemented with various components, as described herein above in FIG. 1. If implemented in software, method 200 may be implemented as a program or software instruction process that is configured for data validation operation in memory applications as described herein. Further, if implemented in software, various instructions related to implementing the method 200 may be stored or recorded in various types of memory. For instance, a computer, a server, or various other types of computing devices having a processor and memory may perform the method 200 and the various operations associated therewith.

At block 201, the simulation software begins its operation. A simulation software uses mathematical models to replicate the behavior of an actual circuit under a given operating condition. The simulation operation is an inexpensive way of predicting circuit behavior under variety of operating circumstances. The one or more variations of the operating conditions may include process variation, electrical variation (e.g., voltage variations) and/or environmental variations (e.g., temperature variations). Further, the configuration of the simulation may be partially based on data and information associated with a simulated real-world operation of the integrated circuit over time, which may include behaviors, characteristics, and boundaries for developing models and/or scenarios for the integrated circuit. In some cases, the model may represent the integrated circuit itself, and the simulation may represent operation of the integrated circuit over time, so as to test the behaviors, characteristics, and boundaries of the integrated circuit in various process, voltage, and temperature (PVT) variations. The simulation software generates characterized electrical data associated with the simulated cells of the integrated circuit.

At block 202, the characterized electrical data is collected for analysis purposes. For instance, the characterized electrical data may be used by EDA tools to perform static timing and power analysis of the integrated circuits and circuit cells. In one embodiment, for each cell associated with a particular integrated circuit different data may be available. Such data may include information from one or more of input pin capacitance, propagation delay from input to output, output transition time, various timing constraints (e.g., hold/setup/min pulse width), current leakage power, and energy per transition. In some instances, a circuit path delay may result from addition of delays associated with cells as part of the circuit path. In other instances, a circuit power may result from addition of power associated with cells as part of the circuit.

At block 203, the collected characterized electrical data is placed in electrical data tables. The characterized electrical data associated with each cell is represented in a plurality of electrical data tables. Each table represents one characteristic of the cell. For example, referring to FIG. 3, electrical data table 300 corresponds with the transition time of a cell (i.e., the time it takes for an output signal to make a transition between the high and low logic states). This particular example shows the fall time of the output signal. A transition delay is a function of capacitance at the output pin (represented by Index_1) and input transition time (represented by Index_2). As such, the entries in Row 1 of the electrical data table 300 correspond to the output of the first capacitance load (i.e., first entry of the Index_1) at a varying input transition time of the Index_2. Similarly, the next rows correspond to the subsequent capacitance loads of the Index_1 at the input transition time of the Index_2. Other tables may include the characterized electrical data associated with delay, transition, timing variation, constraints, capacitance, and power of a cell of an integrated circuit.

At block 204, the electrical data tables are stored in one or more liberty files. The liberty files may be used by EDA tools to perform static timing and power analysis of the integrated circuit. The electrical data associated with each cell of the integrated circuit is stored in one or more liberty files. Sometime 100,000s of electrical data tables may be present within a single liberty file. As explained previously, the electrical data tables within a liberty file may include one or more timing models and/or various timing and power data that may be used to calculate I/O path delays, timing check values, interconnect delays, etc.

At block 205, the system determines whether all necessary data from simulation of a particular cell is collected. If the simulation is not complete, at block 207, one or more operating conditions (e.g. voltage and/or temperature) are modified and the operation proceeds back to step 201 based on the new operating conditions. The number of electrical data tables generated based on the changing operating conditions may depend on a desired accuracy of the results. If it is determined that enough electrical data has been collected from the simulation of a cell, the outputs are stored in a liberty file and the operation concludes by proceeding to block 208.

Figure 4:
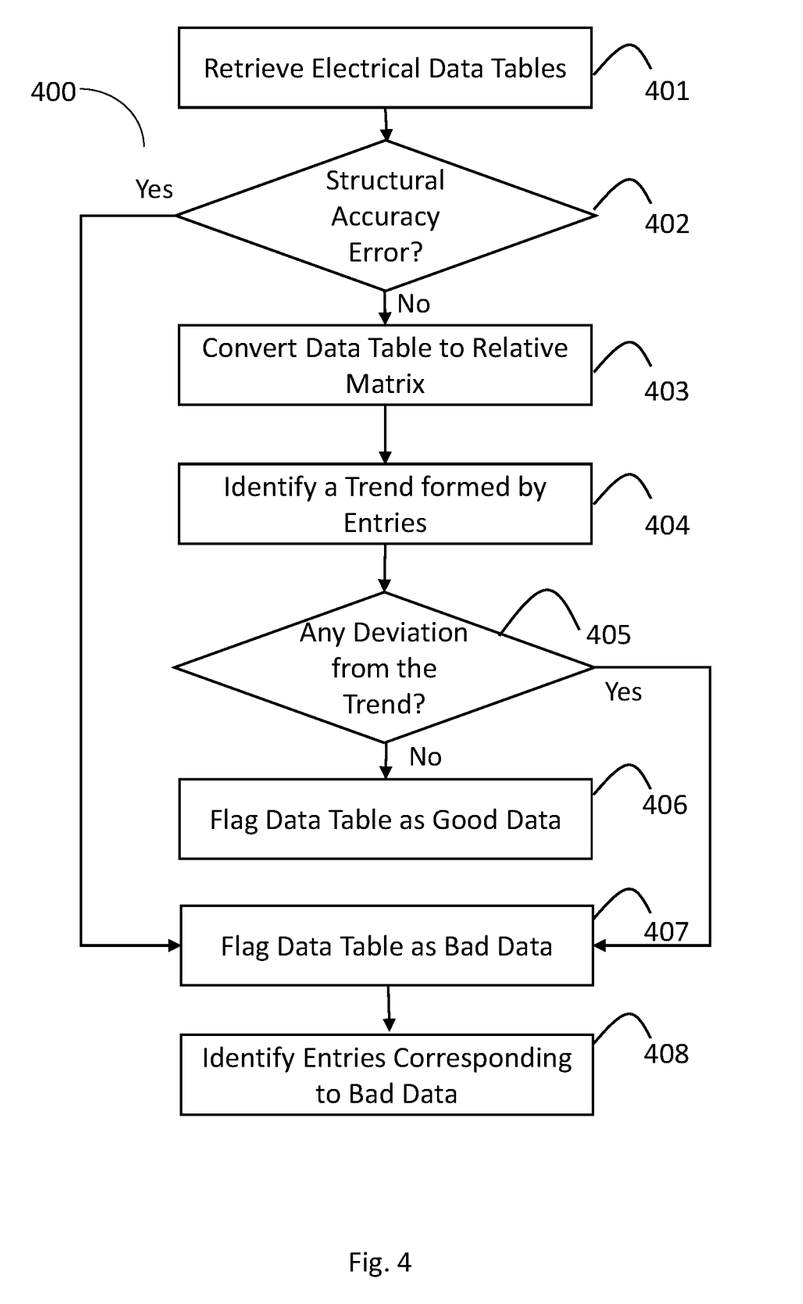
FIG. 4 shows, in flowchart form, an operation to validate characterized electrical data according to an embodiment of the disclosure.

FIG. 4 shows, in flowchart form, an operation 400 to validate characterized electrical data according to an embodiment of the disclosure. The electrical data stored in the liberty files according to method described above with reference to FIG. 3, or other methods of generating liberty files, may be processed by the operation 400 of FIG. 4 for data validation purposes.

It should be understood that even though method 400 may indicate a particular order of operation execution, in some cases, various portions of the operations may be executed in a different order, and on different systems. In some other cases, additional operations and/or steps may be added to and/or omitted from method 400. Method 400 may be implemented in hardware and/or software. If implemented in hardware, method 400 may be implemented with various components, as described herein above in FIG. 1. If implemented in software, method 400 may be implemented as a program or software instruction process that is configured for data validation operation in memory applications as described herein. Further, if implemented in software, various instructions related to implementing the method 400 may be stored or recorded in various types of memory. For instance, a computer, a server, or various other types of computing devices having a processor and memory may perform the method 400 and the various operations associated therewith.

At block 401, the electrical data tables are retrieved from the liberty files. The liberty files may be stored in a database accessible to data validation system. Each liberty file associated with a cell of an integrated circuit may contain a plurality of electrical data tables. Each electrical data table contains characterized electrical data associated with a characteristic of the cell on a particular operating condition. As explained previously, the electrical data table may be formed based on a plurality of indices, each listing different variables. An electrical data table may contain entries in a 5 by 5, 8 by 8, 10 by 10, or tables with other number of rows and columns.

At block 402, the electrical data tables are verified for structural accuracies. The structural accuracy check may include verifying the format that the characterized electrical data are stored in the liberty files. For example, the desired format may be the format that is compatible with analyzing tools, such as tools performing STA and power analysis (e.g., EDA tools). The system also checks to verify all required entries are present in each table. For example, an electrical data table having two indices of eight different variables each, must generate 64 value entries. At block 402, if a structural error is detected, the operation proceeds to block 407. However, if the electrical data tables are structurally verified, the operation proceeds to block 403.

Figure 5:
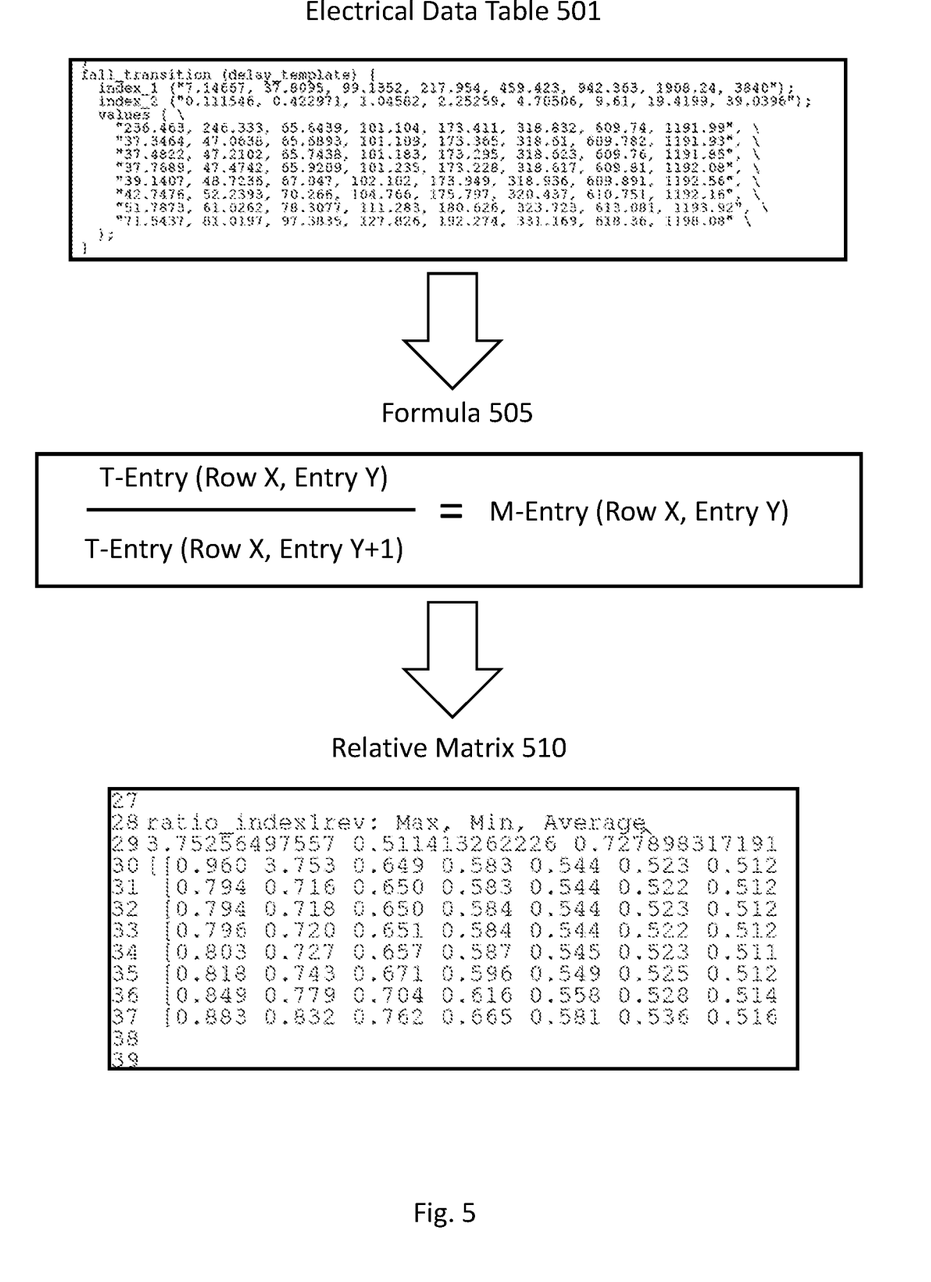
FIG. 5 shows conversion operation of an electrical data table to a relative matrix in accordance with an embodiment of the disclosure.

At block 403, the electrical data table is converted to a relative matrix. Referring to FIG. 5, the conversion operation is shown in more detail. The Electrical Data Table 501 is an 8 by 8 table depicting fall transition time for different capacitance loads represented by index_2. The Relative Matrix 510 is generated by Formula 505 based on the relative value of the entries within the rows of the Electrical Data Table 501. To create the Relative Matrix 510 each entry in a row is divided by its immediate next entry in the same row. For example, the first entry of the Row 1 of the Electrical Data Table 501 (i.e., top leftmost entry) is divided by the second entry (i.e., top second leftmost entry) of the Row 1 of the Electrical Data Table 501. Similarly, the Formula 505 is applied to the rest of the entries of the Electrical Data Table 501. In other embodiments, a relative matrix is formed based on the relative value of the entries within the columns of an electrical data table. In such an example, each entry in a column is divided by its immediate next entry in the same column. In one embodiment, for each electrical data table a plurality of matrices (e.g. a relative matrix based on rows and a relative matrix based on columns) is generated.

At block 404, a trend formed by the entries of each relative matrix is identified. A trend may be defined as a pattern of change or a general direction the entries tend to develop. In one embodiment, the step 403 is optional and as such, the trend is identified for entries of the electrical data table directly. Therefore, the phrase 'data set' is used to refer to the entries represented in either a relative matrix or an electrical data table.

Identifying the trend in some embodiments means matching the trend for a particular data set with other known trend categories. In an instance, the trend may be formed based on a monotonic increase or decrease of the entries through the rows and/or columns of the data set. In other instances, the entries within a data set are mathematically related to entries of another known data set through a formula (e.g., Normalize). Yet in another example, the trend may be identified based on the continuous distribution of the entries within the data set. Different methods of identifying trends within a matrix/electrical data table is further explained with reference to FIGS. 5 through 9 below.

At block 405, the system determines whether any of the entries of the data set deviate from the identified trend. For example, one or more entries may deviate from the trend of entries within a row/column that are monotonically increasing/decreeing. In other examples, one or more entries may increase/decrease with much different ratio in compare to other entries with reference to a particular model. Yet in another instance, one or more isolated entries may be spread too far in a continuous and uniform distribution of entries.

In one embodiment, a deviation from the trend means there are less than the majority of the entries within a data set that deviate from the pattern. However, deviations could be associated with more than one entry. Upon identifying that no deviation is present, the operation proceeds to block 406 to flag the electrical data table associated with the matrix as good data. Otherwise, at block 407, the electrical data table associated with the matrix containing the one or more deviating entries is flagged as bad data. Finally, at block 408, the operation proceeds to identify one or more entries in the electrical data table that correspond with the deviating entries in the relative matrix.

Figure 6:
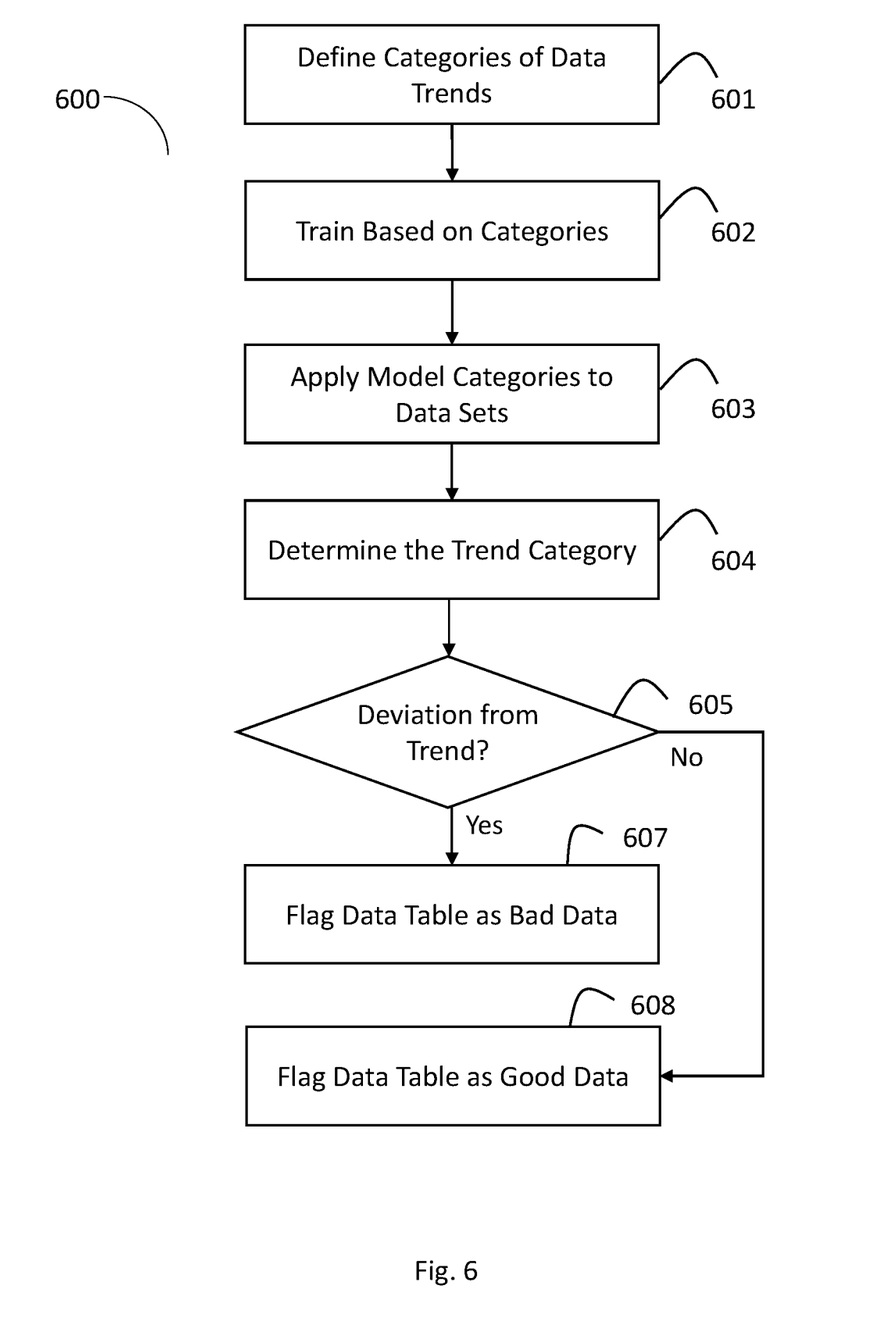
FIG. 6 shows, in flowchart form, an operation to identify a data trend based on machine learning techniques according to an embodiment of the disclosure.

FIG. 6 shows, in flowchart form, an operation 600 to identify a data trend based on machine learning techniques according to an embodiment of the disclosure. Machine learning technics may be used to dynamically identify data trends within a data set (e.g., relative matrix or electrical data table) without the need to statically define thresholds and trend models.

It should be understood that even though method 600 may indicate a particular order of operation execution, in some cases, various portions of the operations may be executed in a different order, and on different systems. In some other cases, additional operations and/or steps may be added to and/or omitted from method 600. Method 600 may be implemented in hardware and/or software. If implemented in hardware, method 600 may be implemented with various components, as described herein above in FIG. 1. If implemented in software, method 600 may be implemented as a program or software instruction process that is configured for data validation operation in memory applications as described herein. Further, if implemented in software, various instructions related to implementing the method 600 may be stored or recorded in various types of memory. For instance, a computer, a server, or various other types of computing devices having a processor and memory may perform the method 600 and the various operations associated therewith.

The operation 600 begins at block 601 by initially defining different categories of trends. The data trend categories may be predetermined or they may be identified using deep learning technology. For example, a trend may be based on entries monotonically increasing/decreasing through the rows/columns of the data sets. In another example, entries maybe a multiple/ratio of their neighboring entries. In yet another instance, the continuous distribution of the entries may form a unique pattern. Therefore, a category may be defined for each possible trend of entries in a data set.

At block 602, the system is trained for each defined category of block 601. The training operation may be performed by analyzing verified data stored in a database. Proceeding with the training operation, the system learns acceptable trends of data point within each defined category.

For example, in a trend category, data entries within a table may be increasing in each row from left to right, however, a slight deviation from this trend may still be acceptable. By analyzing enough data sets, the system learns the acceptable level of tolerance. As such, a model is developed for each category of data trend.

At block 603, model categories are applied to data sets that are being analyzed for data validation. Each data set may match with at least one trend category. In one embodiment, the system is configured to determine the trend categories with a predetermined level of tolerance. Therefore, for example, if entries in a data set increase in each row from left to right, the system recognizes the trend category even if in a row of 8 entries one or two entries violate the pattern. After applying the model categories on the data set, the system will determine the one or more trend category that matches the data set at block 604.

At block 605, the operation 600 determines whether any one or more of the entries within the data set violate the pattern of its matched trend categories. As mentioned before, a level of tolerance is built-in to applying the category models, therefore, some small deviations may be acceptable based on the data training operation of block 602. If one or more entries of the data set deviate from the matched trend, the operation proceeds to flag the data set as bad data at block 607. On the other hand, if none of the entries within the data set violates the matched trend, the data set will be flagged as good data at block 608.

Figure 7:
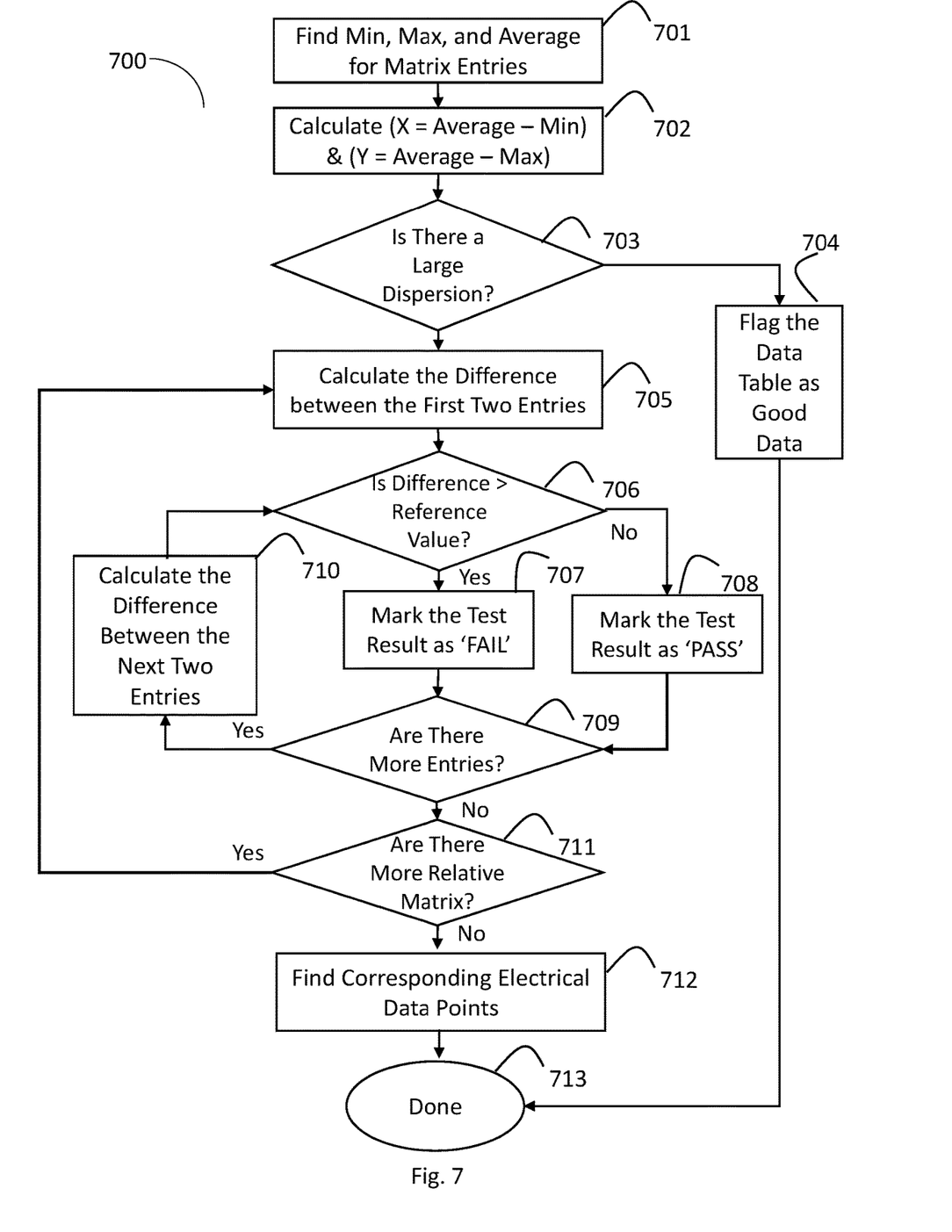
FIG. 7 shows, in flowchart form, an operation to identify a data trend based on the distribution of data set entries according to an embodiment of the disclosure.

FIG. 7 shows, in flowchart form, an operation 700 to identify a data trend based on the distribution of entries in a data set according to an embodiment of the disclosure. In such an embodiment, the abnormal entries may be identified by determining nonconformity of one or more isolated data points from the distribution pattern formed by the majority of entries in a data set.

It should be understood that even though method 700 may indicate a particular order of operation execution, in some cases, various portions of the operations may be executed in a different order, and on different systems. In some other cases, additional operations and/or steps may be added to and/or omitted from method 700. Method 700 may be implemented in hardware and/or software. If implemented in hardware, method 700 may be implemented with various components, as described herein above in FIG. 1. If implemented in software, method 700 may be implemented as a program or software instruction process that is configured for data validation operation in memory applications as described herein. Further, if implemented in software, various instructions related to implementing the method 700 may be stored or recorded in various types of memory. For instance, a computer, a server, or various other types of computing devices having a processor and memory may perform the method 700 and the various operations associated therewith.

At block 701, the minimum and maximum values for the entries within the relative matrix are identified. Also, an average value of all entries within the relative matrix is calculated. Referring to example of FIG. 8, a Relative Matrix 810 is shown. The Relative Matrix 810 is analyzed for its minimum, maximum, and average values. Subsequently, at block 702, the absolute value of the difference between the average value and the minimum value, shown as X, and the absolute value of the difference between the average value and the maximum value, shown as Y, is calculated.

At block 703, based on the calculations of the block 702, it is determined whether the minimum value or the maximum value spreads too far from the average value. In one embodiment, a threshold is defined to determine how much of a deviation is considered too far. For example, the threshold may be predetermined. In other instances, the smaller difference may be set as a reference value and the other difference is compared to the reference value. In such an example, only deviations that are within some predetermined multiple of the reference value is considered acceptable. A deviation above the threshold value indicates a large dispersion in the data set.

Figure 8:
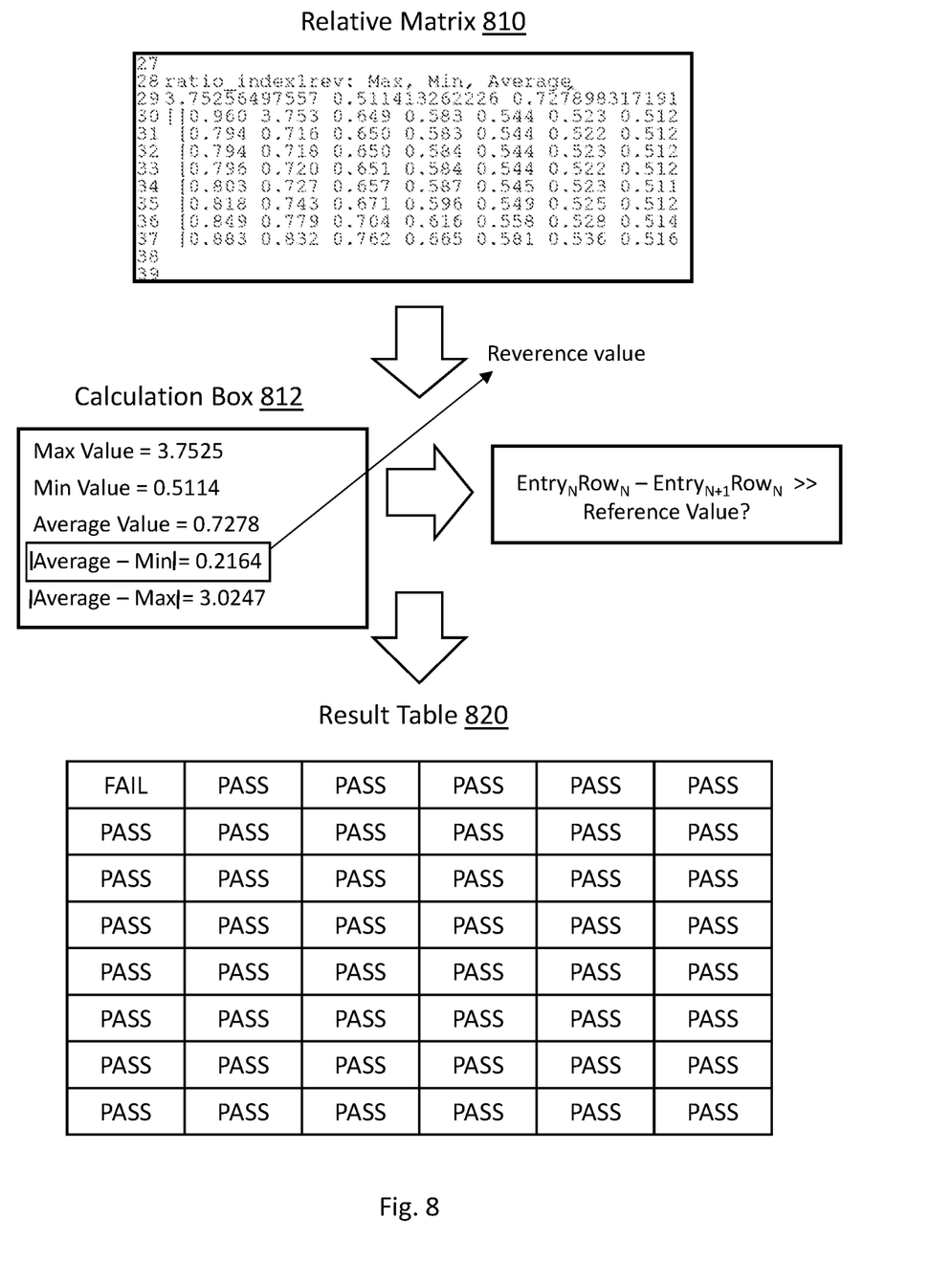
FIG. 8 shows an example of finding data trends for a relative matrix in accordance with an embodiment of the disclosure.

The steps 701 and 702 of FIG. 7 are explained with reference to the Calculation Box 812 of FIG. 8. The average value of the entries within the Relative Matrix 810 is calculated to be 0.7278. While the absolute value of the difference between the average and minimum value is 0.2164, the absolute value of the difference between the average and maximum value is 3.0247. As such, there is a clear skew on maximum value side of the equation. If the absolute value of the difference between the average and minimum value is set as the reference value, the deviation of the maximum value from the average is more than 10 time the reference value.

Referring back to FIG. 7, at block 703, it is determined whether a large dispersion exist in entries of the relative matrix. If no large dispersion exist, the operation proceeds to block 704. At block 704, the electrical data table corresponding to the relative matrix table under review is labeled as good data. However, if at block 703 it is determined that a large dispersion exist, the operation proceeds to block 705 to identify all entries attributing to such a large dispersion.

At block 705, the difference between the first two entries of the relative matrix is calculated. For a relative matrix that is formed based the relative value of the entries within the columns of an electrical data table as explained above with respect to FIG. 5, the first two entries may be the top two entries of the leftmost column. For a relative matrix that is formed based the relative value of the entries within the rows of an electrical data table as explained above with respect to FIG. 5, the first two entries may be the two leftmost entries of the top row. For example, the Relative Matrix 810 is formed based on the relative value of entries within the rows of the electrical data table, therefore, the absolute value of the difference between the first two entries of the first row is calculated as shown below:

Difference Value=Entry$_1$Row$_1$−Entry$_2$Row$_1$=0.960−3.753=2.793

At block 706, it is determined whether the difference value is greater than the reference value. If the reference value is less than the difference value, the operation proceeds to block 707 where a location in a database designated for the two entries is marked as "FAIL". On the other hand, if the reference value is greater than the difference value, the operation proceeds to block 708 where the location in the database associated with the two entries is marked as "PASS". For instance, with reference to the example of FIG. 8, the Difference Value for the first two entries was calculated to be 2.793. Since the Difference Value of 2.793 is greater than the Reference Value of 0.2164, the location in Result Table 820 is marked as "FAIL".

The Result Table 820 is database in memory to store result of the analysis above. The database may be accessed in subsequent operations to identify the characterized electrical data point associated with the entries in the relative matrix. In an embodiment, the data is stored in a file with delimiters.

At block 709, it is determined whether there is an additional pair of entries that have not been analyzed yet. An operating sequence is defined such that all entries of the relative matrix are analyzed with respect to the entries next to them. For example, for the relative matrix that is formed based on the relative value of the entries within the rows, the operation may begin by the top row going from the left to right and end with the last two left entries on the bottom row. Similarly, for a relative matrix that is formed based on the relative value of the entries within the columns, the operation may begin with the top two entries of the left column and end with the bottom two entries of the right column.

In one embodiment, the difference value is based on the difference between an entry and all its neighboring entries. Referring to the Relative Matrix 810 of FIG. 8, the top left corner entry, 0.960, has 3 other neighboring entries of 3.753, 0.716, and 0.794. However, the second entry in the second row, 0.716, has 8 neighboring entries of 0.960, 3.753, 0.649, 0.65, 0.65, 0.718, 0.794, and 0.794. In one embodiment, the operating sequence is defined such that all difference values are calculated without a repetition.

Referring back to FIG. 7, if it is determined at block 709 that there is an additional pair of entries for analysis, the operation loops back through block 710 to block 706. At block 710, the difference value based on the next two entries is calculated. For example, if entries 1 and 2 of the first row was analyzed in the first round, in the second round the entries 2 and 3 of the first row will be analyzed. On the other hand, if at block 709 it is determined that there are no additional pairs of entries for analysis, the operation proceeds to block 711.

At block 711, it is determined whether there is an additional relative matrix associated with the electrical data table under analysis. For example, if the analysis of a relative matrix based on the relative value of the entries within the rows is completed the analysis continues to analyzing the relative matrix based on the relative value of the entries within the columns of the table. In case an additional relative matrix is present for the particular data table, the operation proceeds back to block 705 to begin with calculating the difference value for the first two entries of the matrix. If there is no additional relative matrix, the operation proceed to block 712.

At block 712, the characterized electrical data points corresponding to abnormal entries in the relative matrix is identified. In one embodiment, using the outcomes stored in the result table, the relative matrix entries contributing to the abnormalities are marked. Subsequently, the entries are mapped to their corresponding values in the electrical data table. In other embodiments, a reverse operation may be used to convert the relative matrix back to the electrical data table. Finally, at block 713, the operation concludes with storing the outcomes in the memory.

Figure 9:
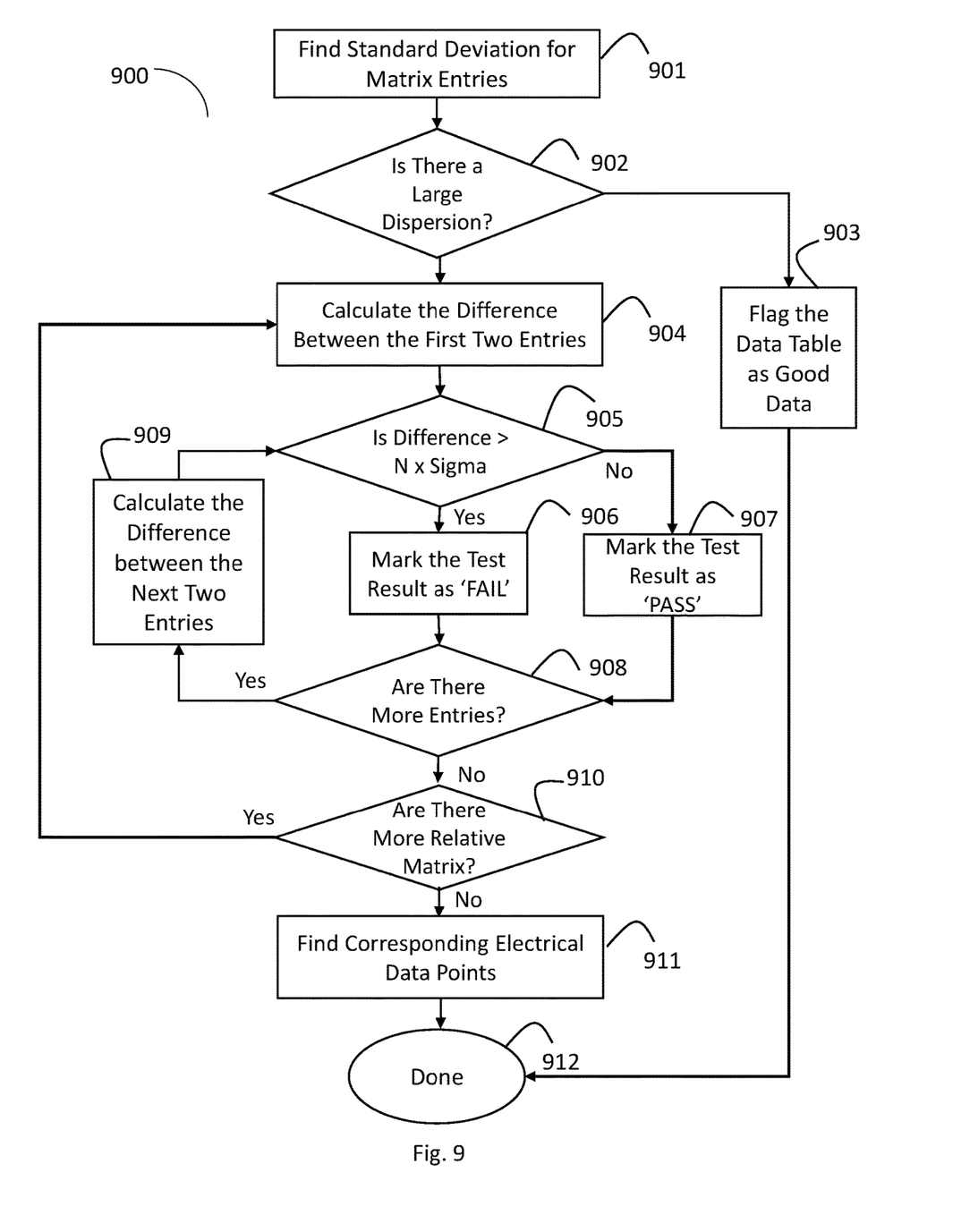
FIG. 9 shows, in flowchart form, an operation to identify a data trend based on the distribution of data set Sentries according to another embodiment of the disclosure.

FIG. 9 shows, in flowchart form, an operation 900 to identify a data trends based on the distribution of entries according to another embodiment of the disclosure. At block 901, the standard deviation for the entries of the relative matrix is determined. Standard deviation quantifies the amount of variation or dispersion of a set of data values. For a relative matrix with a continuous distribution, a large standard deviation may be indicative of abnormality within the data set.

Therefore, at block 902, based on the calculated standard deviation of the relative matrix, it is determined whether the data set is too dispersed. In one embodiment, the standard deviation value may be compared to a predetermined threshold. In one embodiment, the predetermined threshold may be identified based on an analysis of good data with machine learning techniques. In other embodiments, the dispersion is determined to be too large if at least one entry of the relative matrix is larger than some multiple of the sigma (e.g., entry greater than 4a). A continuous distribution with a small dispersion indicates that the there are no abnormality within the data set, therefore, the operation proceeds to block 903. At block 903, the data table corresponding to the relative matrix under study is labeled as good data. On the other hand, if it is determined at block 902 that there is a large dispersion in the data set, the operation proceeds to block 904 to identify all entries contributing to such a large dispersion.

At block 904, the difference between the first two entries of the relative matrix is calculated. For example, the first two entries may be the top two values of the first column or the leftmost entries of the top row. At block 905, the difference is compared to a multiple of sigma (e.g., 4σ). If the difference is less than the multiple of sigma, the operation proceeds to block 907. However, if the difference is greater than the multiple of sigma, the operation proceeds to block 906. Blocks 906 to 911 of operation 900 are similar to aspects of operation 700 described with reference to FIG. 7 and will not be repeated hereinafter for the sake of brevity. At block 912, the operation concludes with storing the outcomes in the memory.

Described herein are various implementations of a method for validating data points associated with an integrated circuit. In one implementation, the method may include retrieving data table associated with an integrated circuit, wherein the data table includes characterized electrical data associated with one or more cells of the integrated circuit. Further, the method may include converting the data table to one or more relative matrices. The one or more relative matrices are analyzed to determine a trend formed by entries of the one or more relative matrices. Further, the method may include determining whether one or more entries of the one or more relative matrices deviate from the trend. In response to the determination, the data table is flagged.

Described herein are various implementations of a non-transitory computer-readable medium having stored thereon a plurality of computer-executable instructions which, when executed by a computer, cause the computer to validate characterized electrical data. In one embodiment, one or more categories of data trends associated with characterized electrical data is defined. A plurality of data samples for each of the one or more categories of data trends are analyzed for training purposes. Further, a plurality of data models are developed, where each data model corresponds to a category of one or more categories of data trends. The plurality of data models are applied to a data set to determine a specific trend corresponding to the data set. Finally, it is determined whether the data set includes one or more entries that deviate from the specific trend.

Described herein are various implementations of a system for validating characterized electrical data. In one implementation, the system may include a processor and memory having stored thereon instructions that, when executed by the processor, cause the processor to validate characterized electrical data associated with an integrated circuit. For instance, data table associated with an integrated circuit is retrieved. The data table may include characterized electrical data associated with one or more cells of the integrated circuit. Further, the data table is converted to one or more relative matrices. The one or more relative matrices is analyzed to determine a trend formed by entries of the one or more matrices. Further, it is determined whether the one or more entries of the one or more relative matrices deviate from the trend. In response to the determination that one or more entries of the one or more relative matrices deviate from the trend, the data table is flagged.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   retrieving data table associated with an integrated circuit, wherein the data table includes characterized electrical data associated with one or more cells of the integrated circuit;
   converting the data table to one or more relative matrices;
   analyzing the one or more relative matrices to determine a trend formed by entries of the one or more relative matrices;
   determining whether one or more entries of the one or more relative matrices deviate from the trend; and
   flagging the data table in response to the determination that one or more entries of the one or more relative matrices deviate from the trend.

2. The method of claim 1, wherein analyzing the one or more relative matrices comprises:
   taking an average of the entries associated with each of the one or more relative matrices;
   defining a first value as an absolute value of a difference between a largest value entry and the average;
   defining a second value as an absolute value of a difference between a smallest value entry and the average; and
   determining whether a difference between the first value and the second value is above a predetermined threshold.

3. The method of claim 1, wherein analyzing the one or more relative matrices comprises:
   calculating standard deviation of entries within each relative matrix;
   determining whether the standard deviation is above a predetermined threshold; and
   identifying one or more isolated entries that result in the standard deviation increasing above the predetermined threshold.

4. The method of claim 1, further comprises: analyzing the data table to identify structural inaccuracies.

5. The method of claim 1, wherein analyzing the one or more relative matrices comprises comparing each entry of the one or more relative matrices to all its neighboring entries.

6. The method of claim 1, wherein the characterized electrical data includes information associated with delay, transition, timing variation, constraints, capacitance, and power of the one or more cells of the integrated circuit.

7. The method of claim 1, wherein converting the data table comprises:
   generating a first relative matrix based on a relative relation between entries of each row of the data table; and
   generating a second relative matrix based a relative relation between entries of each column of the data table.

8. The method of claim 1, wherein analyzing the one or more relative matrices comprises determining whether the entries of the one or more relative matrices are monotonic across rows and columns of the one or more relative matrices.

9. The method of claim 1 further comprising:
   identifying the one or more entries of the one or more relative matrices that deviate from the trend; and
   identifying one or more data points in the data table that correspond with the one or more entries of the one or more relative matrices.

10. A non-transitory computer-readable medium having stored thereon a plurality of computer-executable instructions which, when executed by a computer, cause the computer to:
    define one or more categories of data trends associated with characterized electrical data;
    analyzing a plurality of data samples for each of the one or more categories of data trends for training purposes;
    develop a plurality of data models, where each data model corresponds to a category of one or more categories of data trends;
    apply the plurality of data models to a data set to determine a specific trend corresponding to the data set; and determine whether the data set includes one or more entries that deviate from the specific trend.

11. The computer-readable medium of claim 10, wherein the instructions further comprise instructions to:
   identify the one or more entries that deviate from the specific trend; and
   determine specific characterized electrical data corresponding to the one or more entries that deviate from the specific trend.

12. The computer-readable medium of claim 11, wherein the instructions further comprise instructions to:
   flag the specific characterized electrical data corresponding to the one or more entries that deviate from the specific trend as bad data.

13. The computer-readable medium of claim 10, wherein the data set is a relative matrix associated with an electrical data table.

14. The computer-readable medium of claim 13, wherein the specific trend is based on at least one of a monotonic increase of matrix entries within rows of the relative matrix from left to right and monotonic decrease of matrix entries within rows of the relative matrix from left to right.

15. The computer-readable medium of claim 13, wherein the specific trend is based on at least one of a monotonic increase of matrix entries within columns of the relative matrix from top to bottom and monotonic decrease of matrix entries within columns of the relative matrix from bottom to top.

16. A system, comprising:
   a processor; and
   memory having stored thereon instructions that, when executed by the processor, cause the processor to:
      retrieve data table associated with an integrated circuit, wherein the data table includes characterized electrical data associated with one or more cells of the integrated circuit;
      convert the data table to one or more relative matrices;
      analyze the one or more relative matrices to determine a trend formed by entries of the one or more matrices;
      determine whether one or more entries of the one or more relative matrices deviate from the trend; and
      flag the data table in response to the determination that one or more entries of the one or more relative matrices deviate from the trend.

17. The system of claim 16, wherein at least one of the one or more relative matrices are based on a relative relation between entries of each row of the data table.

18. The system of claim 16, wherein the characterized electrical data includes information associated with delay, transition, timing variation, constraints, capacitance, and power of the one or more cells of the integrated circuit.

19. The system of claim 16, wherein the characterized electrical data corresponding to each data table is collected under a specific operating condition.

20. The system of claim 19, wherein the specific operation condition is based on an operation of the integrated circuit at a specific voltage and a specific temperature.

* * * * *